United States Patent [19]

Ogawa

[11] Patent Number: 5,608,540
[45] Date of Patent: Mar. 4, 1997

[54] PREFERENTIAL RECORDING SYSTEM FOR A FACSIMILE APPARATUS

[75] Inventor: Satoshi Ogawa, Kawasaki, Japan

[73] Assignee: Fujitsu Limited, Kawasaki, Japan

[21] Appl. No.: 303,876

[22] Filed: Sep. 9, 1994

Related U.S. Application Data

[63] Continuation of Ser. No. 838,342, Feb. 20, 1992, abandoned.

[30] Foreign Application Priority Data

Feb. 20, 1991 [JP] Japan ................................. 3-047670

[51] Int. Cl.⁶ ........................................ H04N 1/00
[52] U.S. Cl. ............................. 358/434; 358/438
[58] Field of Search ........................ 358/400, 401, 358/434, 435, 436, 438, 439, 402, 403

[56] References Cited

U.S. PATENT DOCUMENTS

| | | | |
|---|---|---|---|
| 4,586,086 | 4/1986 | Ohzeki | 358/407 |
| 4,630,261 | 12/1986 | Irvin | 370/81 |
| 4,772,955 | 9/1988 | Kurahayashi et al. | 358/444 |
| 4,991,028 | 2/1991 | Kokubu | 358/438 |
| 5,065,426 | 11/1991 | Greenstein et al. | |
| 5,140,439 | 8/1992 | Tanaka | 358/434 |

FOREIGN PATENT DOCUMENTS

| | | | |
|---|---|---|---|
| 0436238 | 7/1991 | European Pat. Off. | |
| 3415839 | 5/1988 | Germany . | |
| 0024161 | 2/1982 | Japan | 358/434 |
| 2-65460 | 3/1990 | Japan . | |
| 0187889 | 7/1990 | Japan | 358/403 |
| 2280457 | 11/1990 | Japan | 358/440 |
| 3-1636 | 1/1991 | Japan | 358/440 |
| 6225113 | 8/1994 | Japan . | |

*Primary Examiner*—Edward L. Coles, Sr.
*Assistant Examiner*—Thomas L. Stoll

[57] ABSTRACT

In a preferential recording system provided in a transmission unit and a reception unit of a facsimile apparatus, the preferential recording system includes: a priority/time setting unit provided in the transmission unit for setting priority of recording desired time of recording at the reception side into the telegram message to be transmitted from the transmission unit of the transmission side to the reception unit of the reception side; a priority/time decision unit provided in the reception unit for determining the priority of the recording and/or the desired time of the recording set into the telegram message; a priority/time memory also provided in the reception unit for storing the priority of the recording and the actual time of the recording for every telegram message; and a time counting unit also provided in the reception unit for imparting present time and a setting time of recording to the priority/time decision unit.

4 Claims, 13 Drawing Sheets

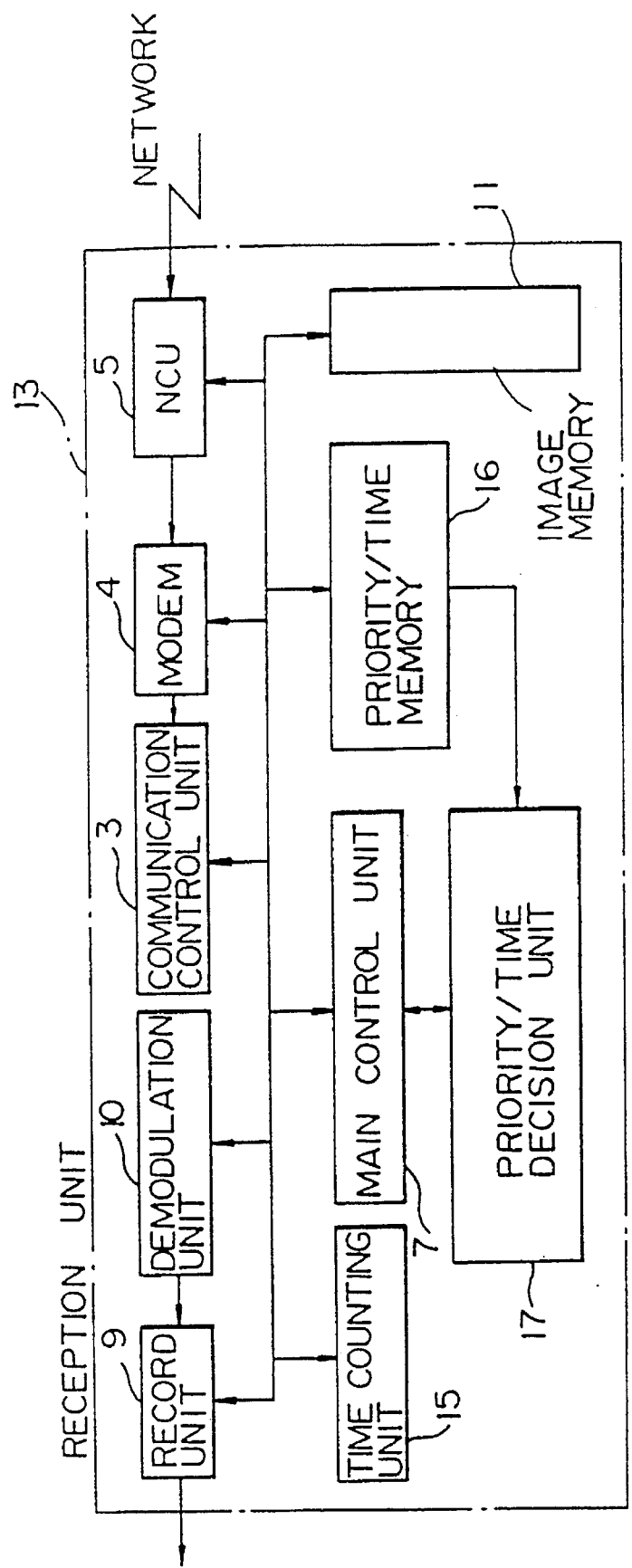

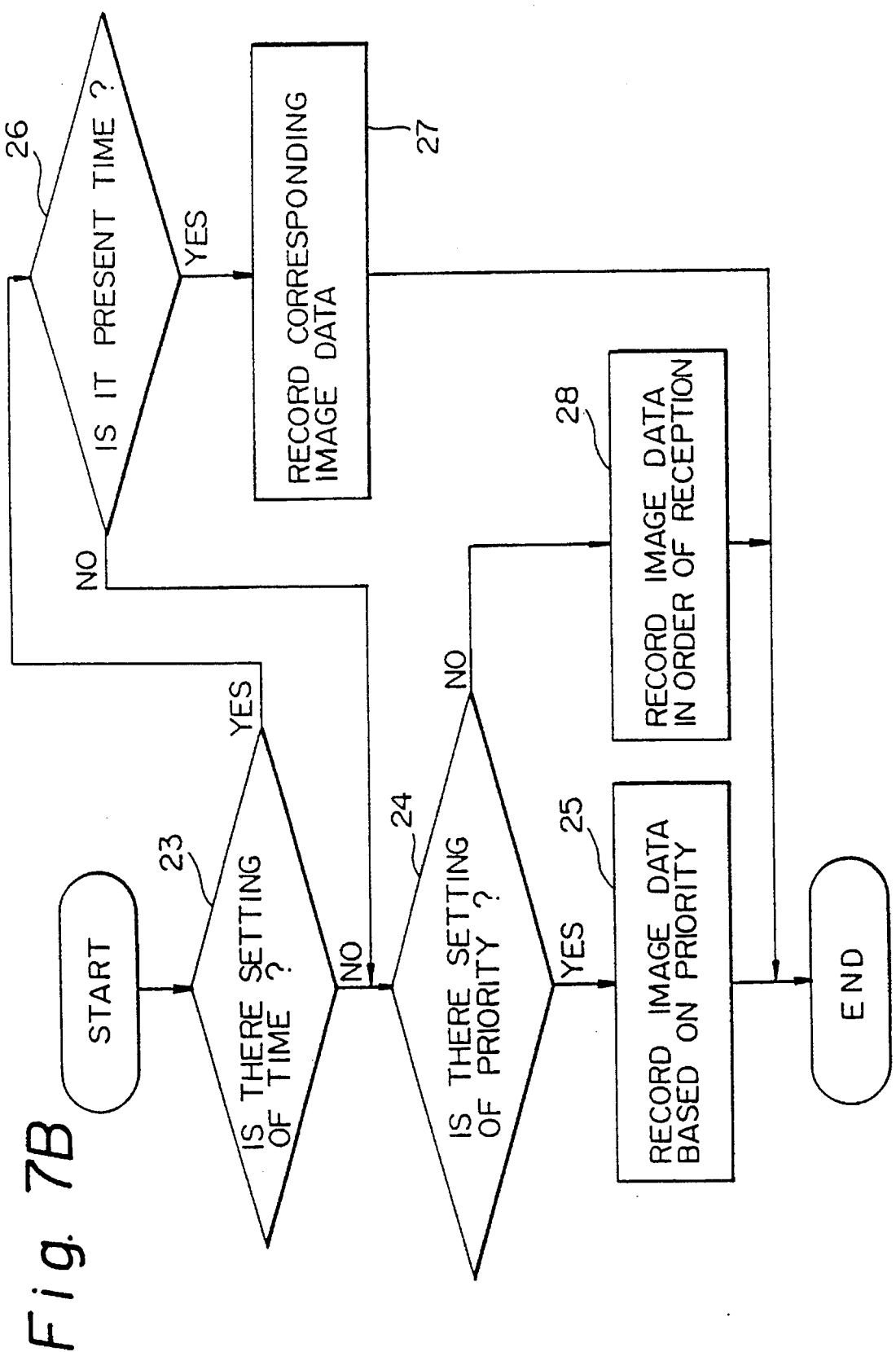

5,608,540

PREFERENTIAL RECORDING SYSTEM FOR A FACSIMILE APPARATUS

This application is a continuation of application Ser. No. 07/838,342, filed Feb. 20, 1992, now abandoned.

BACKGROUND OF THE INVENTION

1. Field of the Invention

The present invention relates to a preferential recording system for a facsimile apparatus, more particularly, it relates to a preferential recording system provided for a transmission unit and a reception unit in a facsimile apparatus, and enabling control of priority of recording of data and/or time of recording in the reception unit of the reception side.

2. Description of the Related Art

A facsimile apparatus is widely used in various fields, particularly, in a company. In general, a plurality of facsimiles are provided for a head office and branches in the company and a facsimile apparatus is formed by a transmission unit and a reception unit. Accordingly, a telegram message is transmitted from the transmission unit of the facsimile apparatus for the transmission side to the reception unit of the facsimile apparatus for the reception side. For example, the telegram message is transmitted from the transmission unit of the facsimile apparatus in the head office (transmission side) to the reception unit of the facsimile apparatus in the branch (reception side).

There are, however, some problems to be solved in the reception side, for example, problems regarding control of priority of recording (i.e., print out of a document) and control of a time of record in the reception unit as explained in detail hereinafter.

SUMMARY OF THE INVENTION

The object of the present invention is to provide a preferential recording system enabling control of priority of recording of data and/or time of recording in a reception unit of a facsimile apparatus in a reception side.

In accordance with the present invention, there is provided a preferential recording system provided in a transmission unit and a reception unit of a facsimile apparatus, and a telegram message transmitted from the transmission unit for a transmission side to the reception unit for a reception side of the facsimile apparatus, including:

a priority/time setting unit provided in the transmission unit for the setting of priority of recording and/or time of recording at the reception side into the telegram message to be transmitted from the transmission unit of the transmission side to the reception unit of the reception side;

a priority/time decision unit provided in the reception unit for determining the priority of the recording and/or the time of the recording set into the telegram message;

a priority/time memory also provided in the reception unit for storing the priority of the recording and the time of the recording for every telegram message; and a time counting unit also provided in the reception unit for informing present time and a setting time of recording to the priority/time decision unit.

In the preferred embodiment, the priority and/or time of the recording is set into a NSS (Non-Standard Facilities Set-up) signal transmitted from the transmission side to the reception side.

In the preferred embodiment, the priority/time setting unit preferentially controls the time of the recording when both priority of the recording and the time of recording are simultaneously set into the telegram message.

BRIEF DESCRIPTION OF THE DRAWINGS

In the drawings:

FIG. 6B shows another embodiment of a facsimile apparatus shown in FIG. 2B;

FIG. 7B is a flowchart for explaining record of data in a reception unit in FIG. 6B.

DESCRIPTION OF PREFERRED EMBODIMENTS

Before describing the preferred embodiments, an explanation will be given of conventional transmission and reception units of a facsimile apparatus.

Figure 1A:
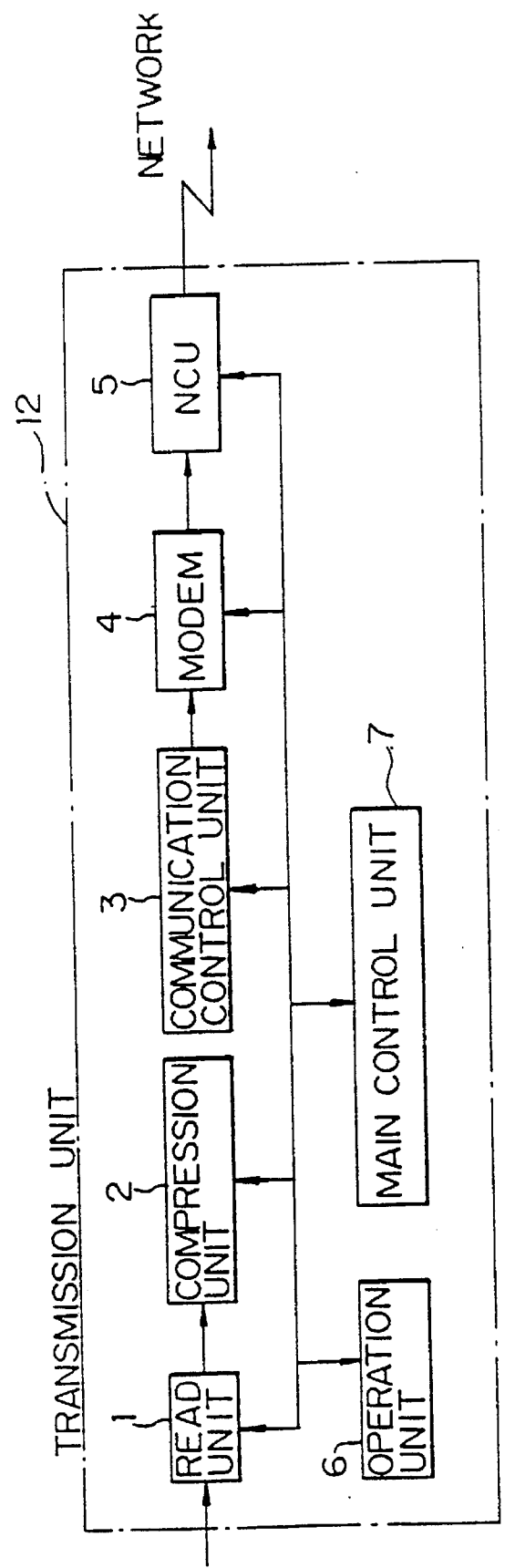
FIG. 1A is a schematic block diagram of a conventional transmission unit of a facsimile apparatus.
Figure 1B:
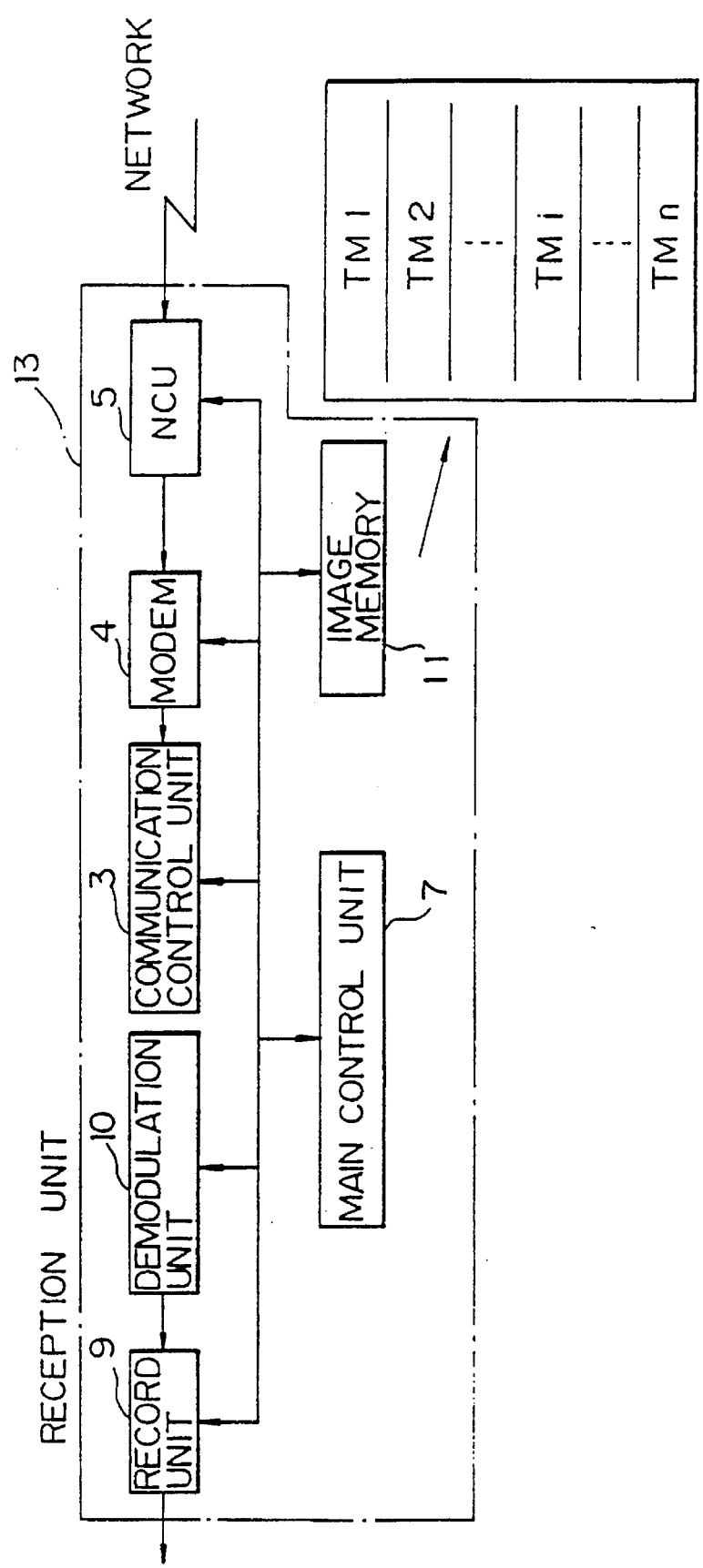
FIG. 1B is a schematic block diagram of a conventional reception unit of a facsimile apparatus.

FIG. 1A is a schematic block diagram of a conventional transmission unit of a facsimile apparatus, and FIG. 1B is a schematic block diagram of a conventional reception unit of a facsimile apparatus. In FIG. 1A, reference number 1 denotes a read unit, 2 a compression unit, 3 a communication control unit, 4 a modem, 5 a network control unit, 6 an operation unit, 7 a main control unit, and 12 a transmission unit. Further, in FIG. 1B, reference number 9 denotes a record unit, 10 a demodulation unit, 11 an image memory, 13 a reception unit.

In FIG. 1A, in the transmission unit of the facsimile apparatus for the transmission side, the read unit 1 reads a document as image data and outputs the image data to the compression unit 2. The compression unit 2 compresses the image data in accordance with a known compression method and outputs the compression data to the communication control unit 3, the modem 4, and the network control unit 5. The compression data is transferred to the network as a telegram message. The main control unit 7 controls the operation of all units 1 to 6.

In FIG. 1B, in the reception unit of the facsimile apparatus for the reception side, the communication unit 3, the modem 4 and the network control unit (NCU) 5 receive the telegram message from the transmission side 12 through the network. The telegram messages TM1 to TMn are sequentially stored in the image memory 11 in accordance with the order of the reception. Accordingly, when recording the telegram message in the record unit 9, first, the telegram message TM1 is read from the image memory 11, demodulated by the demodulation unit 10, and recorded in the record unit 9, next, the telegram message TM2 is read from the image memory 11, and finally, the telegram message TMn is read from the image memory 11 in accordance with the order of reception.

There are, however, problems in the above conventional method. First, when the record unit 9 does not start to record the telegram messages from the image memory 11, the particular telegram message, for example, an urgent telegram message TMi must wait until it receives an order.

Further, the conventional type cannot adjust the record time. That is, it is impossible to appoint the particular record time desired by a user. Some users may require the next morning as the recording time the telegram message was received during the night.

Accordingly, the object of the present invention is to provide a preferential recording system enabling control of priority of recording of data and/or time of recording in the reception unit of the facsimile apparatus in the reception side.

Figure 2A:
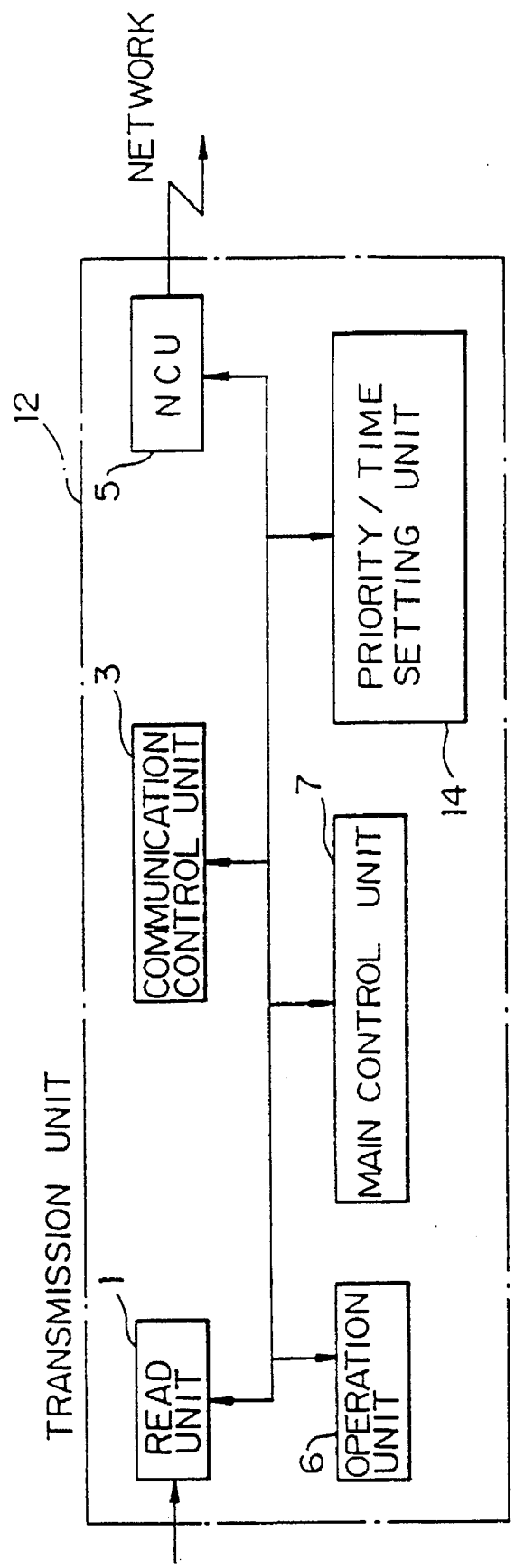
FIG. 2A is a basic structure of a transmission unit according to the present invention.
Figure 2B:
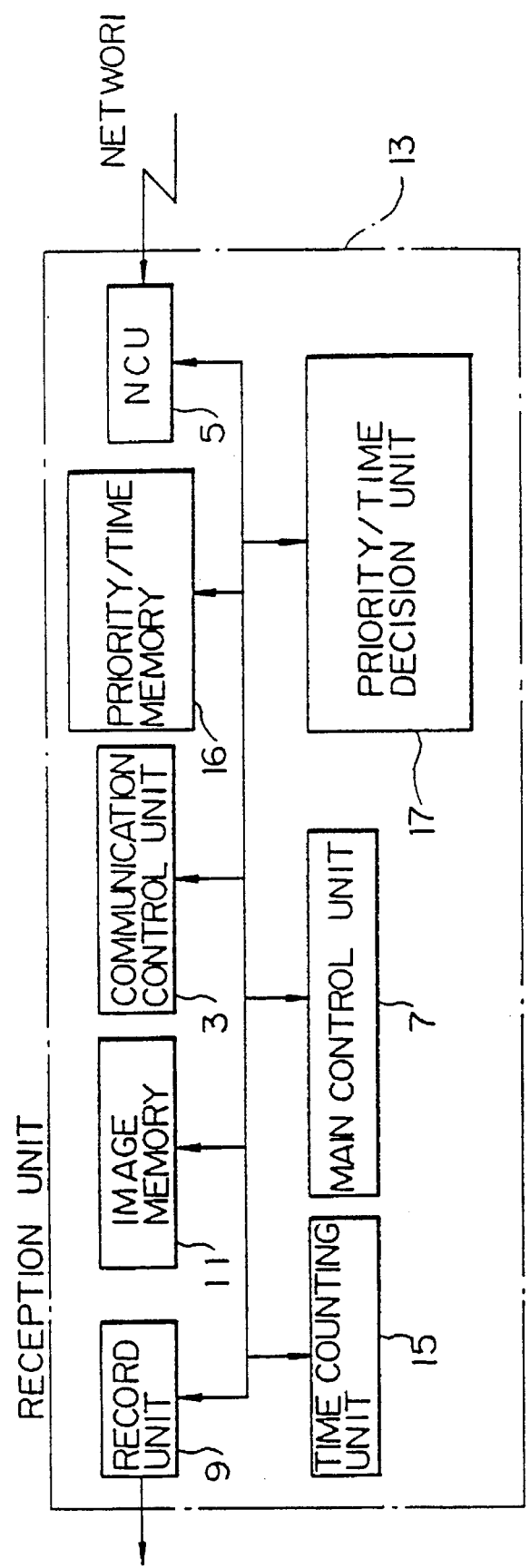
FIG. 2B is a basic structure of a reception unit according to the present invention.

FIG. 2A is a basic structure of a transmission unit according to the present invention, FIG. 2B is a basic structure of a reception unit according to the present invention. In FIGS. 2A and 2B, reference number 14 denotes a priority/time setting unit, 15 a time counting unit, 16 a priority/time memory, and 17 a priority/time decision unit.

Briefly, in the transmission unit 12 of the facsimile apparatus for the transmission side, the priority/time setting unit 14 sets the priority of the recording at the reception side and this priority of the recording is transferred to the reception side through the network. Further, the priority/time setting unit 14 sets the time of the recording at the reception side and the time of the recording is also transferred to the reception side. Still further, the priority/time setting unit 14 can preferentially control the time of the recording when the priority of the recording and the time of the recording are simultaneously set therein.

As the detailed explanation, the priority and/or the time of the recording are input from the operation unit 6 to the priority/time setting unit 14. Then, the priority and/or the time of the recording are transferred to the reception side 13 prior to the transmission of the image data through the network.

In the reception unit 13 for the reception side, the priority and/or the time of the recording are stored in the priority/time memory 16, and the image data is stored in the image memory 11. The priority/time decision unit 17 reads the content of the priority/time memory 16 and determines the priority of the recording and/or the time of the recording.

As a result of the decision, when the priority of the recording is set, the image data corresponding to the priority is read from the image memory 11 and recorded in the record unit 9. When the time of the recording is set, the image data corresponding to the time of the recording is read from the image memory 11 in accordance with the setting time at the time counting unit 15. Still further, the priority/time setting unit 14 can preferentially control the time of the recording when both the priority and the time of the recording are simultaneously set. The time of the recording is preferentially selected in the priority/time decision unit 17.

Figure 3A:
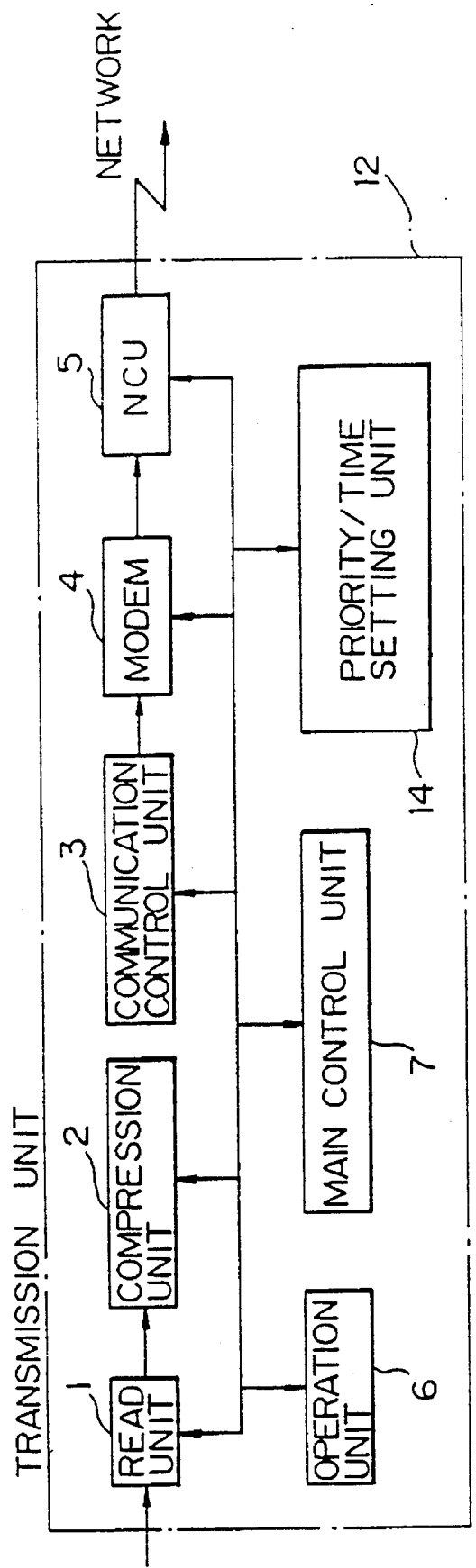
FIG. 3A shows one embodiment of a transmission unit shown in FIG. 2A.
Figure 3B:
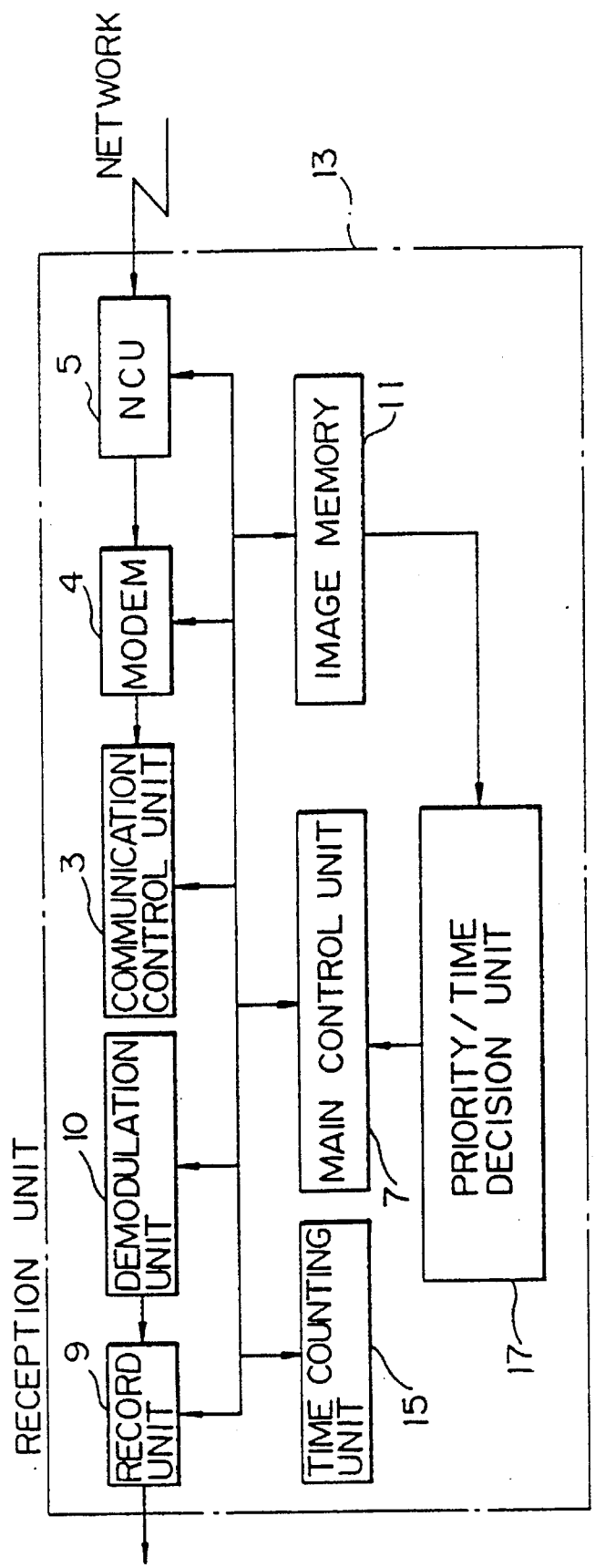
FIG. 3B shows one embodiment of a reception unit shown in FIG. 2B.

FIG. 3A shows one embodiment of a transmission unit shown in FIG. 2A, and FIG. 3B shows one embodiment of a reception unit shown in FIG. 2B. In FIGS. 3A and 3B, the same reference numbers as used in FIGS. 1A to 2B are attached to this drawing. As is obvious from the drawing, the priority/time setting unit 14 is added to the conventional structure shown in FIG. 1A in the transmission unit 12. Further, the time counting unit 15 and the priority/time decision unit 17 are added to the conventional structure shown in FIG. 1B. In this embodiment, the priority/time memory 16 is included in the image memory 11.

Figure 4A:
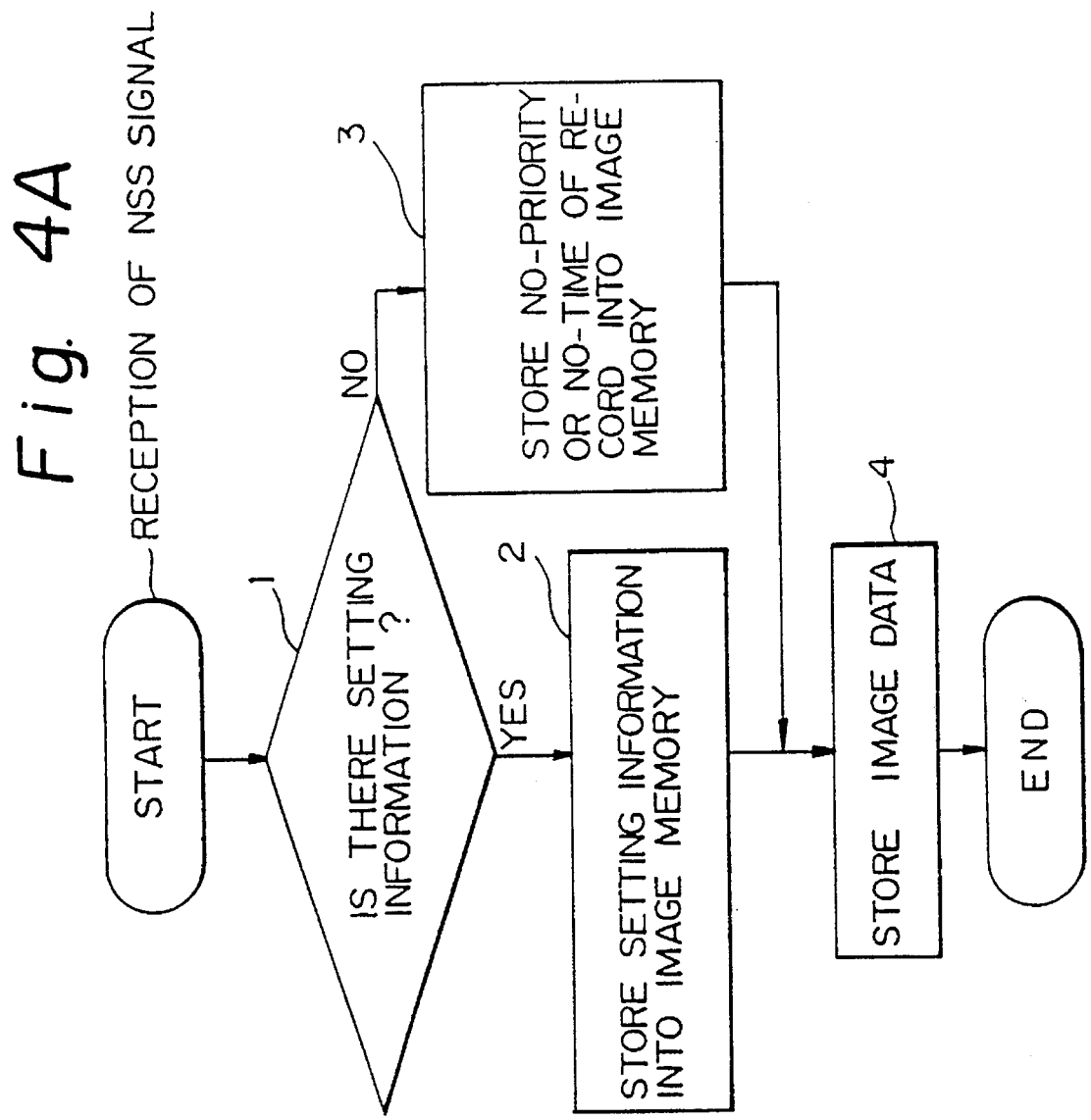
FIG. 4A is a flowchart for explaining reception of data in a reception unit in FIG. 3B.
Figure 4B:
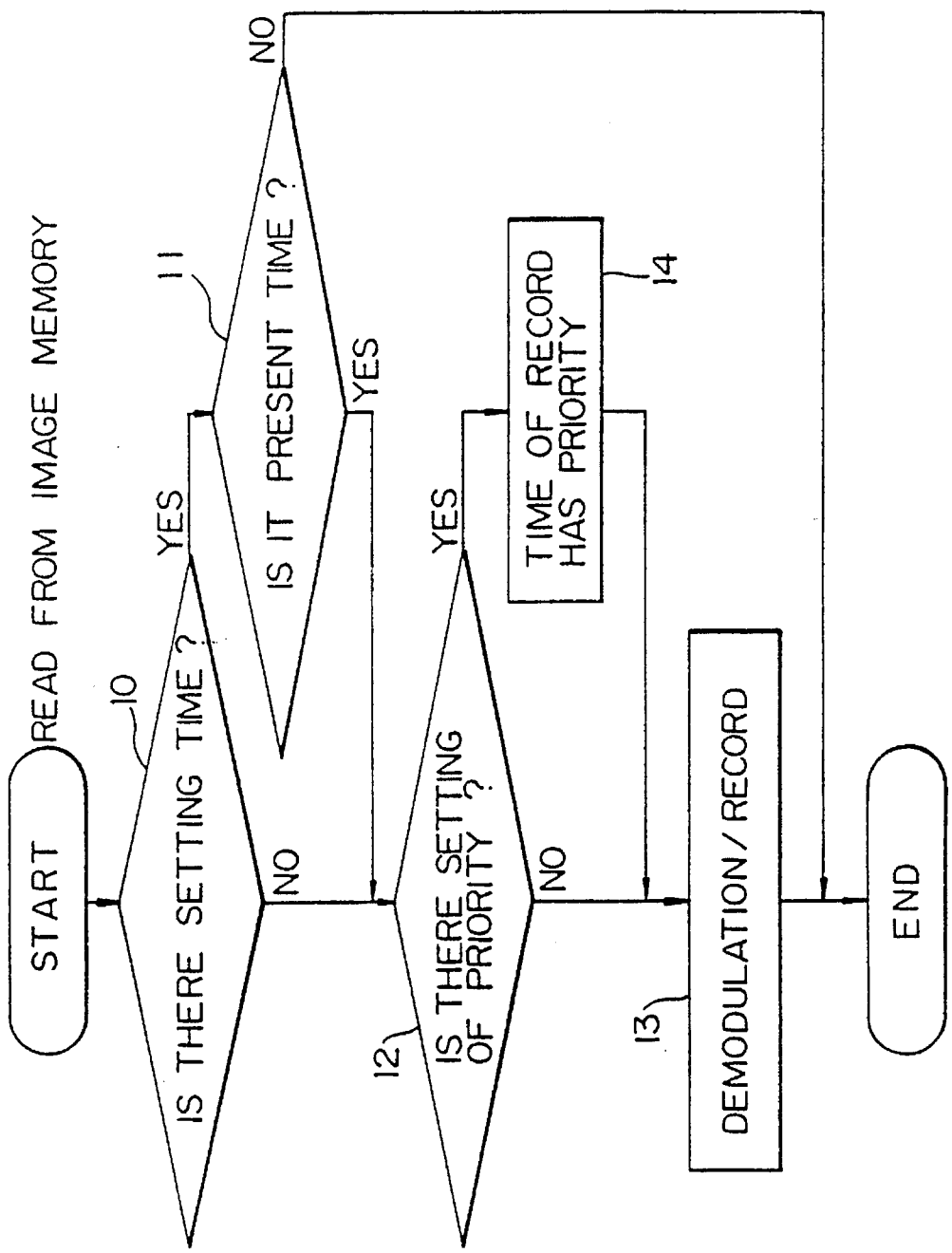
FIG. 4B is a flowchart for explaining recording of data in a reception unit in FIG. 3B.

FIG. 4A is a flowchart for explaining reception of data in a reception unit in FIG. 3B, and FIG. 4B is a flowchart for explaining recording of data in a reception unit in FIG. 3B. Further, FIG. 5A is a diagram for explaining contents of the image memory 11, and FIG. 5B is a diagram for explaining the communication procedure between the transmission side T and the reception side R.

Figures 5A, 5B:
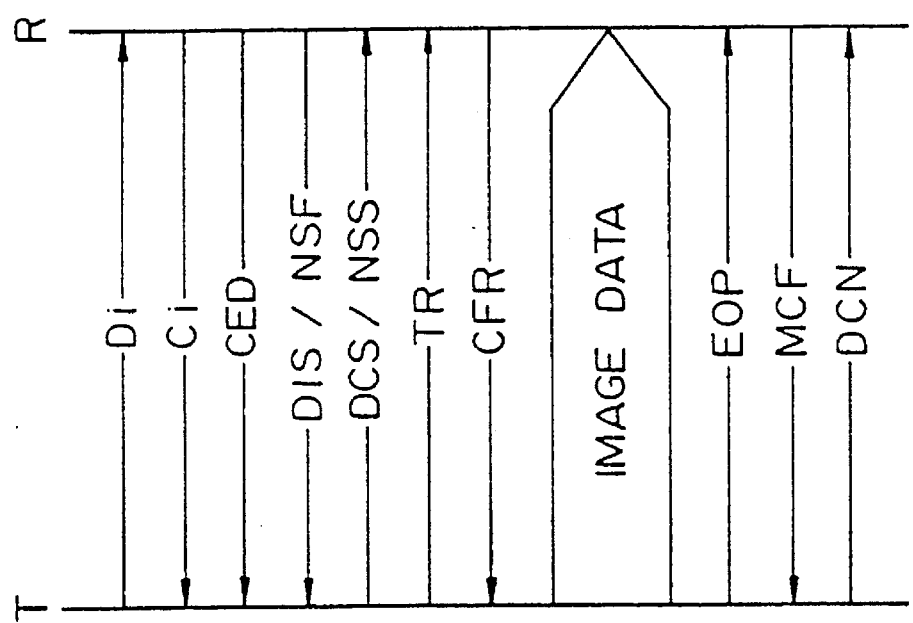
FIG. 5A is a diagram for explaining contents of an image memory in the reception unit shown in FIG. 3B.
FIG. 5B is a diagram for explaining the communication procedure between the transmission side and the reception side of the facsimile apparatus.

In FIG. 5B, the dial calling Di is performed from the transmission side T to the reception side R, and a detection signal Ci indicating reception is returned from the reception side R to the transmission side T. Further, the reception side R returns a CED (Called Station Identification) signal and a DIS/NSF (Digital Identification Signal/Non-Standard Facilities) signal. The transmission side T further transmits a DCS/NSS (Digital Command Signal/Non-Standard Facilities Set-up) signal to the reception side. The priority and time of the recording are transmitted within the NSS signal.

Further, the transmission side T transmits a training signal TR to the reception side R and the reception side R returns a CFR (Confirmation to Receive) signal to the transmission side T. The transmission side T starts to transmit the image data to the reception side R after reception of the CFR signal. When the transmission of the image data is completed, the transmission side T transmits an EOP (End of Message) signal to the reception side R and the reception side R returns a MCF (Message Confirmation) signal to the transmission side T. When the transmission side T receives the MCF signal, the transmission side T returns a DCN (Disconnection) signal to the reception side R so that the transmission is completed between the transmission side T and the reception side R.

In FIG. 4A, when the reception unit 13 for the reception side receives the NSS signal, the priority/time decision unit 17 determines whether or not the priority and/or the time of the recording is set in the NSS signal (step 1). When the priority and/or the time of the recording is set (YES) as a setting information, the setting information is stored in the image memory (step 2). When the priority and/or the time of the recording is not set (NO), no-priority and/or no-time of the recording is stored in the image memory 11 (step 3). Further, the image data is stored in the image memory 11 (step 4).

In FIG. 4B, when the image data is read from the image memory 11, the priority/time decision unit 17 determines whether or not the time of the recording is set (step 10). When the time of the recording is set (YES), the priority/time decision unit 17 further compares the set time with the present time (step 11). When the present time does not indicate the set time (NO), the recording is performed in the set time.

When the time of the recording is not set (NO) in the step 10 and when the present time indicates the set time (YES)

in step 11, the priority/time decision unit 17 determines whether or not the priority is set (step 12). When the priority is set (YES), the image data having the time of the record is initially recorded (step 14). When the priority is not set (NO) in the step 12 and when the priority is set, the image data is demodulated and recorded in the record unit 9.

In FIG. 5A, the image memory stores a table having the priority of the recording and the time of the recording for every corresponding telegram message TM. As shown in the table, the telegram message TM1 has the priority "2" (i.e., second priority) of the recording and the time of the recording is not set (see, mark of "$_{13}$"). The telegram message TM2 has no priority of the record (see "0"), and the time of the record is set to nine o'clock (9:00). Accordingly, the telegram message TM2 is preferentially recorded at nine o'clock. In the case of the telegram message TMi, this telegram message TMi has the priority "3" (third priority) and the set time of ten o'clock (10:00). Accordingly, the image data having the set time of ten o'clock is preferentially recorded at ten o'clock A.M. in the record unit 9.

Figure 6A:
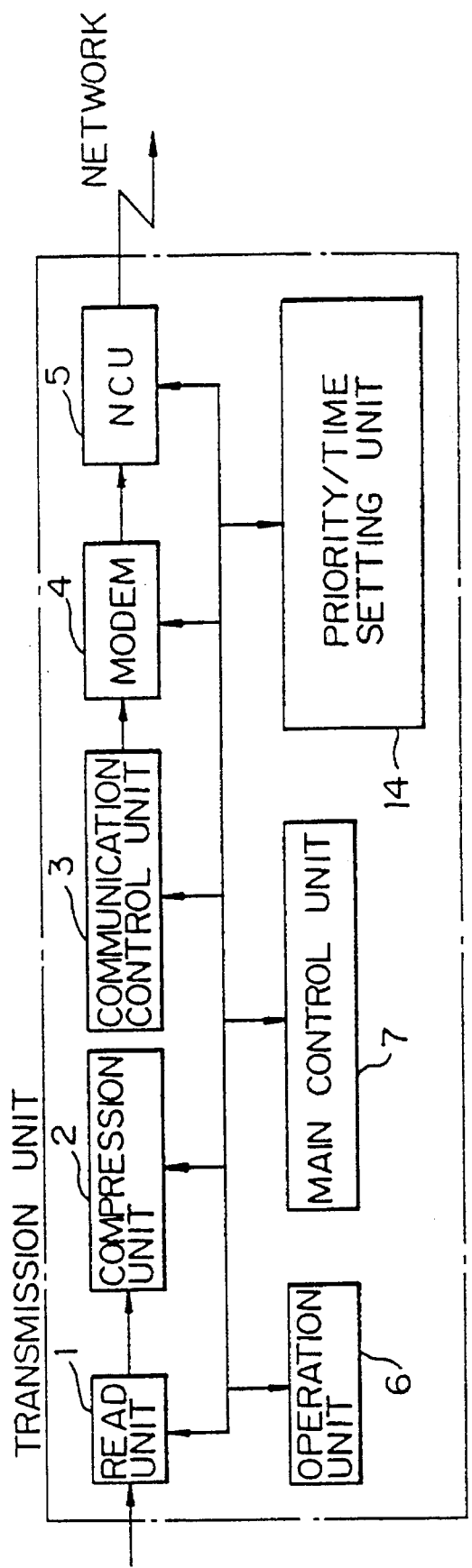
FIG. 6A shows another embodiment of a facsimile apparatus shown in FIG. 2A.

FIG. 6A shows another embodiment of a transmission unit shown in FIG. 2A, and FIG. 6B shows another embodiment of a reception unit shown in FIG. 2B. Further, FIG. 7A is a flowchart for explaining reception of data in a reception unit in FIG. 6B, and FIG. 7B is a flowchart for explaining the recording of data in a reception unit in FIG. 6B.

In FIG. 6A, since the transmission side 12 has the same structure as the first embodiment shown in FIG. 3A, the explanation is omitted. In FIG. 6B, the priority/time memory 16 is added to the first embodiment shown in FIG. 3B. That is, the priority/time memory is separated from the image memory 11 in this embodiment to increase the capacity of the image memory 11.

Figure 7A:
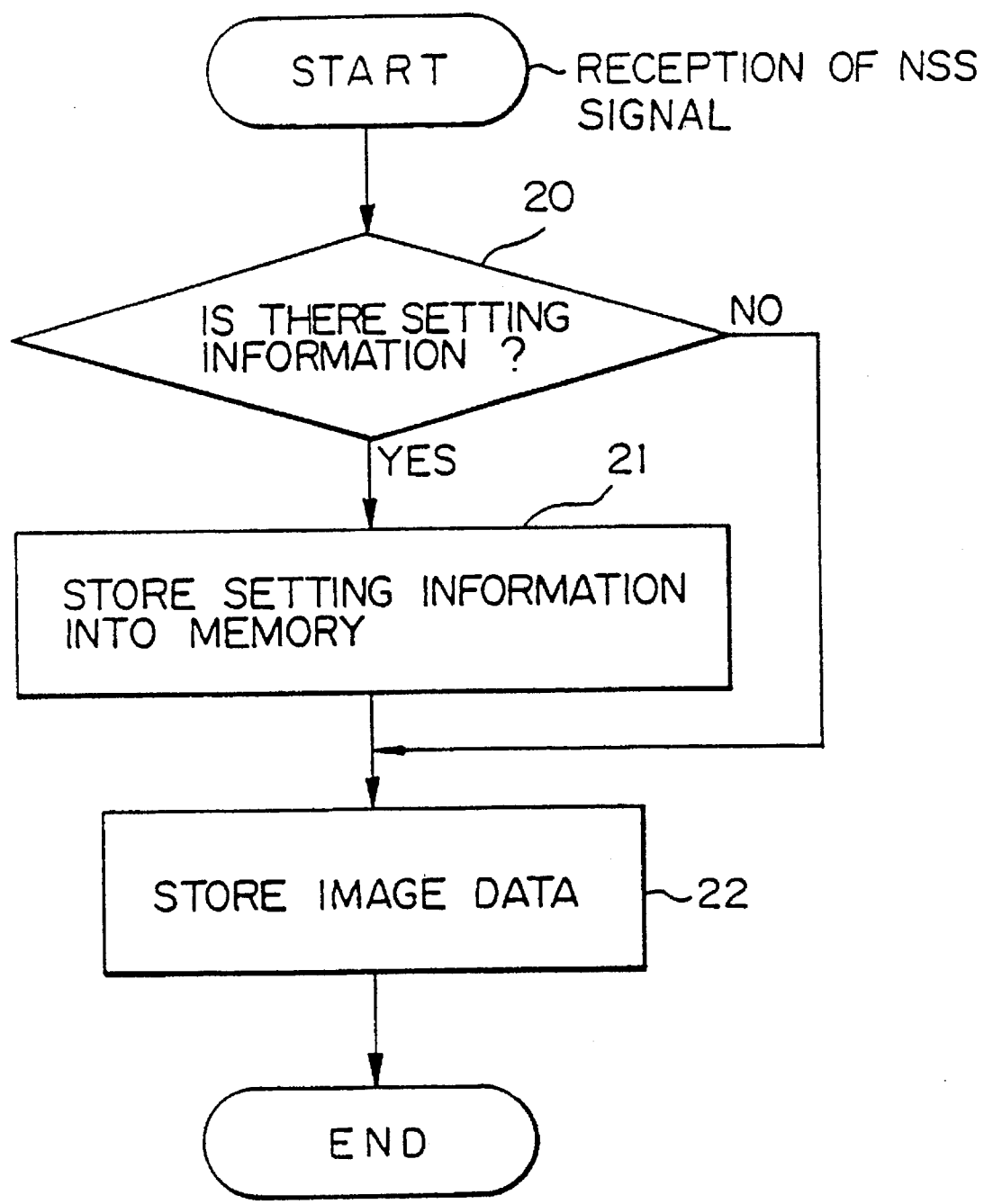
FIG. 7A is a flowchart for explaining reception of data in a reception unit in FIG. 6B.

In FIG. 7A, when the reception unit 13 for the reception side receives the NSS signal, the priority/time decision unit 17 determines whether or not the priority and/or the time of the recording is set in the NSS signal (step 20). When the priority and/or the time of the recording is set (YES) as the setting information, the setting information is stored in the priority/time memory 16 (step 21). When the priority and/or the time of the recording is not set (NO), the setting information is not stored in the priority/time memory 16 and only the image data is stored in the image memory 11 (step 22).

In FIG. 7B, the priority/time decision unit 17 determines whether or not the time of the recording is set in accordance with check of the priority/time memory 16 (step 23). When the time of the recording is set (YES), the priority/time decision unit 17 further compares the set time with the present time (step 26). When the present time indicates the set time (YES), the recording is performed in the set time (step 27).

When the time of the recording is not set (NO) in the step 23 and when the present time does not indicate the set time (NO) in step 26, the priority/time decision unit 17 determines whether or not the priority is set (step 24). When the priority is set (YES), the image data having the time of the recording is initially recorded (step 25). When the priority is not set (NO) in the step 24, the image data is recorded in accordance with the order of the reception in the recording unit 9 (step 28).

I claim:
1. A preferential recording system provided in a transmission unit and a reception unit of a facsimile apparatus, and a telegram message being transmitted from the transmission unit for a transmission side to the reception unit for a reception side of the facsimile apparatus, comprising:

priority/time setting means provided in the transmission unit for setting priority of recording and desired time of recording at the reception side into the telegram message to be transmitted from the transmission unit of the transmission side to the reception unit of the reception side;

priority/time decision means provided in the reception unit for determining the priority of the recording and the desired time of the recording set into the telegram message after the telegram message is received by the reception unit, said priority/time decision means preferentially controlling the actual time of recording when both priority of the recording and the desired time of recording are simultaneously set into the telegram message;

a priority/time memory also provided in the reception unit for storing the priority of the recording and the actual time of the recording for every telegram message; and time counting means also provided in the reception unit for indicating a present time for comparison with a setting time of recording by the priority/time decision means.

2. A preferential recording system as claimed in claim 1, wherein the priority and desired time of the recording is set into a NSS (Non-Standard Facilities Set-Up) signal transmitted from the transmission side to the reception side.

3. A preferential recording system provided in a transmission unit and a reception unit of a facsimile apparatus, and a telegram message being transmitted from the transmission unit for a transmission side to the reception unit for a reception side of the facsimile apparatus, comprising:

priority/time setting means provided in the transmission unit for setting priority of recording at the reception side into the telegram message to be transmitted from the transmission unit of the transmission side to the reception unit of the reception side;

priority/time decision means provided in the reception unit for determining the priority of the recording set into the telegram message after the telegram message is received by the reception unit, said priority/time decision means preferentially controlling the actual time of recording when both the priority of the recording and a desired time of recording are simultaneously set into the telegram message;

a priority/time memory also provided in the reception unit for storing the priority of the recording and the actual time of the recording for every telegram message; and time counting means also provided in the reception unit for indicating a present time for comparison with a setting time of recording by the priority/time decision means.

4. A preferential recording system as claimed in claim 3, wherein the desired time of the recording is set into a NSS (Non-Standard Facilities Set-Up) signal transmitted from the transmission side to the reception side.

* * * * *

UNITED STATES PATENT AND TRADEMARK OFFICE
CERTIFICATE OF CORRECTION

PATENT NO. : 5,608,540
DATED :
INVENTOR(S) : March 4, 1997

Ogawa

It is certified that error appears in the above-indentified patent and that said Letters Patent is hereby corrected as shown below:

In the Title
Section [54], change "PREFERENTIAL RECORDING SYSTEM FOR A FACSIMILE APPARATUS" to --FACSIMILE SYSTEM THAT CAN SET EITHER PRIORITY OR DESIRED TIME OF RECORDING OR BOTH--.

In the Abstract
Section [57], line 6, before "desired" insert --and/or--.

Column 5
Line 12, change "$_{13}$") to --"____")--.

Signed and Sealed this

Eighth Day of July, 1997

Attest:

BRUCE LEHMAN

*Attesting Officer*          *Commissioner of Patents and Trademarks*

UNITED STATES PATENT AND TRADEMARK OFFICE
CERTIFICATE OF CORRECTION

PATENT NO. : 5,608,540
DATED : March 4, 1997
INVENTOR(S) : Satoshi OGAWA

It is certified that error appears in the above-indentified patent and that said Letters Patent is hereby corrected as shown below:

On the title page,
    Item [73] Assignee: delete "Fujitsu Limited, Kawasaki, Japan" and insert --Matsushita Graphic Communication Systems, Inc., Tokyo, Japan--.

Signed and Sealed this

Nineteenth Day of May, 1998

Attest:

BRUCE LEHMAN

*Attesting Officer*    *Commissioner of Patents and Trademarks*